United States Patent [19]
Samejima et al.

[11] Patent Number: 5,465,561
[45] Date of Patent: Nov. 14, 1995

[54] MOWER UNIT HAVING A BEVEL GEAR MECHANISM

[75] Inventors: Kazuo Samejima; Mitsuhiro Matsuyama; Shigeru Morita; Masaji Kure, all of Sakai, Japan

[73] Assignee: Kubota Corporation, Japan

[21] Appl. No.: 339,344

[22] Filed: Nov. 14, 1994

[30] Foreign Application Priority Data

May 10, 1994 [JP] Japan ................................. 6-096615
Jun. 7, 1994 [JP] Japan ................................. 6-124857

[51] Int. Cl.⁶ .................................................. A01D 35/00
[52] U.S. Cl. .................................................. 56/11.8
[58] Field of Search ..................... 56/10.8, 11.7, 56/11.8, 12.8, 13.3–13.8; 406/99, 100

[56] References Cited

U.S. PATENT DOCUMENTS

| | | | |
|---|---|---|---|
| 4,527,380 | 7/1985 | Fushiya et al. | 56/12.8 |
| 4,716,717 | 1/1988 | Ogano et al. | 56/11.8 X |
| 5,064,315 | 11/1991 | Samejima et al. | 406/100 |

FOREIGN PATENT DOCUMENTS 5-15722  3/1993  Japan .

*Primary Examiner*—Michael Powell Buiz
*Attorney, Agent, or Firm*—Webb Ziesenheim Bruening Logsdon Orkin & Hanson

[57] ABSTRACT

A mower unit having a bevel gear mechanism includes an input shaft extending substantially horizontally; a first bevel gear mounted on the input shaft; an output shaft extending substantially vertically; a second bevel gear meshed with the first bevel gear and mounted on one end of the output shaft; a blade mounted on the other end of the output shaft; a blade housing coveting the blade and defining an opening for receiving the output shaft; a beating holder rotatably supporting the output shaft; a bevel gear case containing the first and second bevel gears; and a pair of fight and left support stays connected to the bevel gear case for mounting the bevel gear case to the blade housing. The bearing holder and support stays are interconnected by reamer bolts, with the blade housing interposed between flange surfaces formed on the beating holder and flange surfaces formed on the support stays. Soft metal packings are interposed between the flange surfaces of the support stays and upper surfaces of the blade housing.

8 Claims, 6 Drawing Sheets

MOWER UNIT HAVING A BEVEL GEAR MECHANISM

BACKGROUND OF THE INVENTION

1. Field of the Invention

The present invention relates to a mower unit attached to a lawn tractor or the like and having a bevel gear mechanism.

2. Description of the Related Art

This type of mower unit is disclosed in Japanese Utility Model Publication No. 1993-15722 and U.S. Pat. No. 5,064,315, for example. This mower unit includes an input shaft extending substantially horizontally, a first bevel gear mounted on the input shaft, an output shaft extending substantially vertically, a second bevel gear meshed with the first bevel gear and mounted on one end of the output shaft, a blade mounted on the other end of the output shaft, a blade housing covering the blade, a beating holder rotatably supporting the output shaft, a bevel gear case enclosing the first and second bevel gears, and a pair of right and left support stays connected to the bevel gear case to mount the bevel gear case to the blade housing.

The mower unit is formed into an integral whole with the bearing holder, bevel gear case and blade housing connected to one another by bolts. Where the bearing holder and bevel gear case, i.e. the bearing holder and support stays, are not interconnected in exact alignment, the positional precision between the bevel gear case and beating holder, and hence the angle between the output shaft and input shaft, deviates from a desired value. This deviation, even if small, will produce increased noise due to meshing between the first and second bevel gears. The blade housing, since it is formed of a plate material, inevitably has an uneven plate thickness and a deformation occurring in time of manufacture. Consequently, where the bevel gear case and support stays are interconnected particularly with the blade housing interposed therebetween, the positional precision between the bevel gear case and bearing holder fails to attain a required level.

SUMMARY OF THE INVENTION

The object of the present invention is to provide a mower unit of the type noted above which allows the support stays and bearing holder to be interconnected with a high degree of positional precision.

The above object is fulfilled, according to the present invention, by a mower unit having a bevel gear mechanism, comprising a beating holder including a first flange device defining first flange surfaces, and a pair of tight and left support stays connected to a bevel gear case and including a second flange device defining second flange surfaces, wherein the first flange device and the second flange device are interconnected by reamer bolts with the blade housing interposed between the first flange surfaces and second flange surfaces.

The bearing holder and support stays define flange surfaces, respectively, and are tightened together by reamer bolts, with the blade housing interposed between the flange surface, thereby to attain an enhanced assembly precision. Preferably, soft metal packings are interposed between the second flange surfaces and upper surfaces of the blade housing. When the reamer bolts are tightened, the soft metal packings fit with the upper surfaces of the blade housing, i.e. undergo an elastic deformation. This deformation absorbs errors in plate thickness of the blade housing opposed to the fight and left flange surfaces. Consequently, the bearing holder and support stays, i.e. the bearing holder and bevel gear case, are assembled together with improved precision.

In order to promote the precision for assembling the bearing holder and support stays, the bearing holder may include flanges defining upper and lower flange surfaces, the upper flange surfaces being connected to flange surfaces formed on the right and left support stays by reamer bolts or the like, and the lower flange surfaces being connected to upper surfaces of the blade housing also by reamer bolts. In this construction, the right and left support stays may be connected to the bearing holder with the respective flange surfaces placed in face to face contact. Thus, the support stays and bearing holder are assembled with high precision regardless of the plate thickness and manufacturing errors of the blade housing.

Other features and advantages of the invention will be apparent from the following description of the preferred embodiments taken in conjunction with the drawings.

DETAILED DESCRIPTION OF THE PREFERRED EMBODIMENTS

Figure 1:
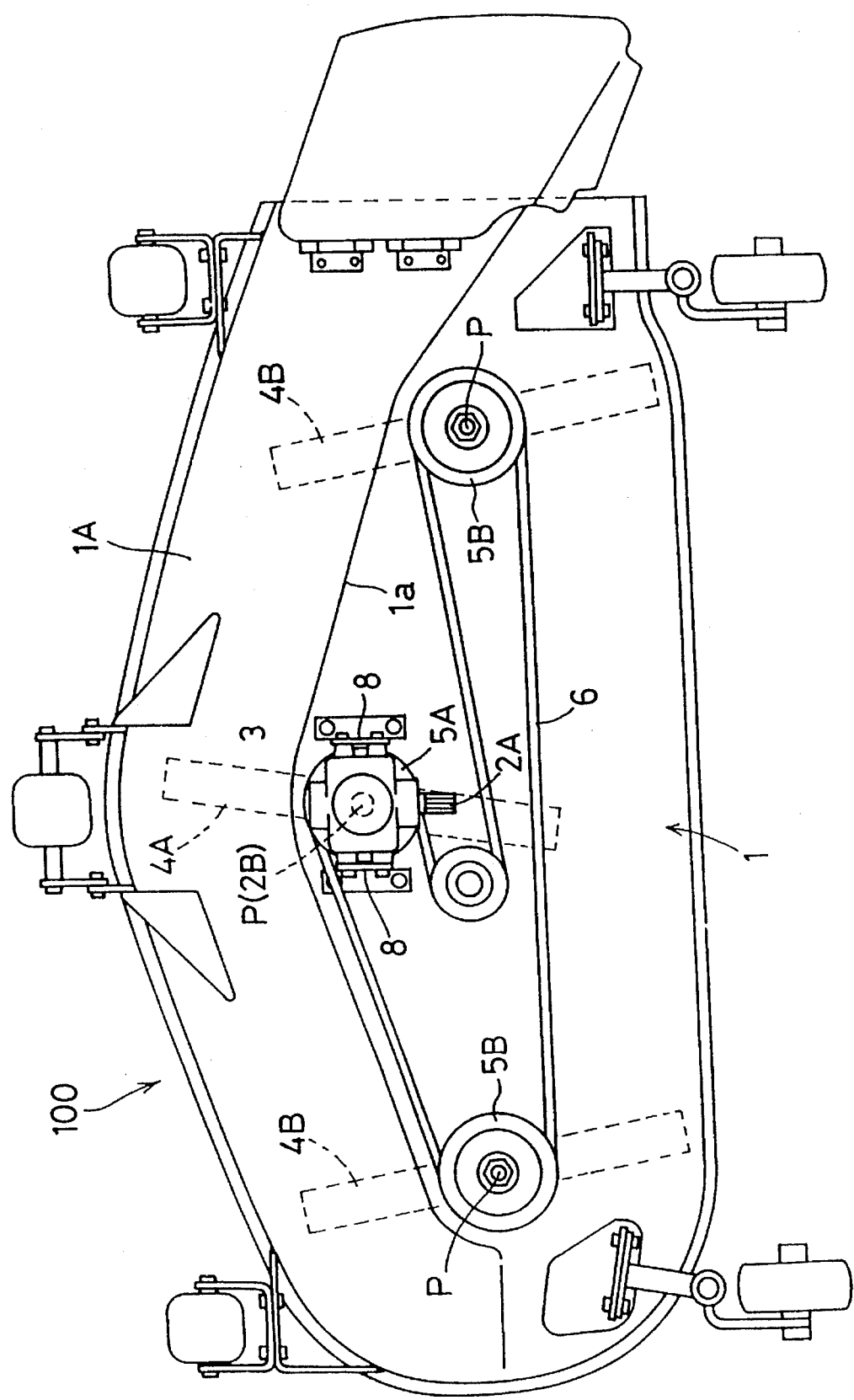
FIG. 1 is a plan view of a mower unit according to the present invention.
Figure 2:
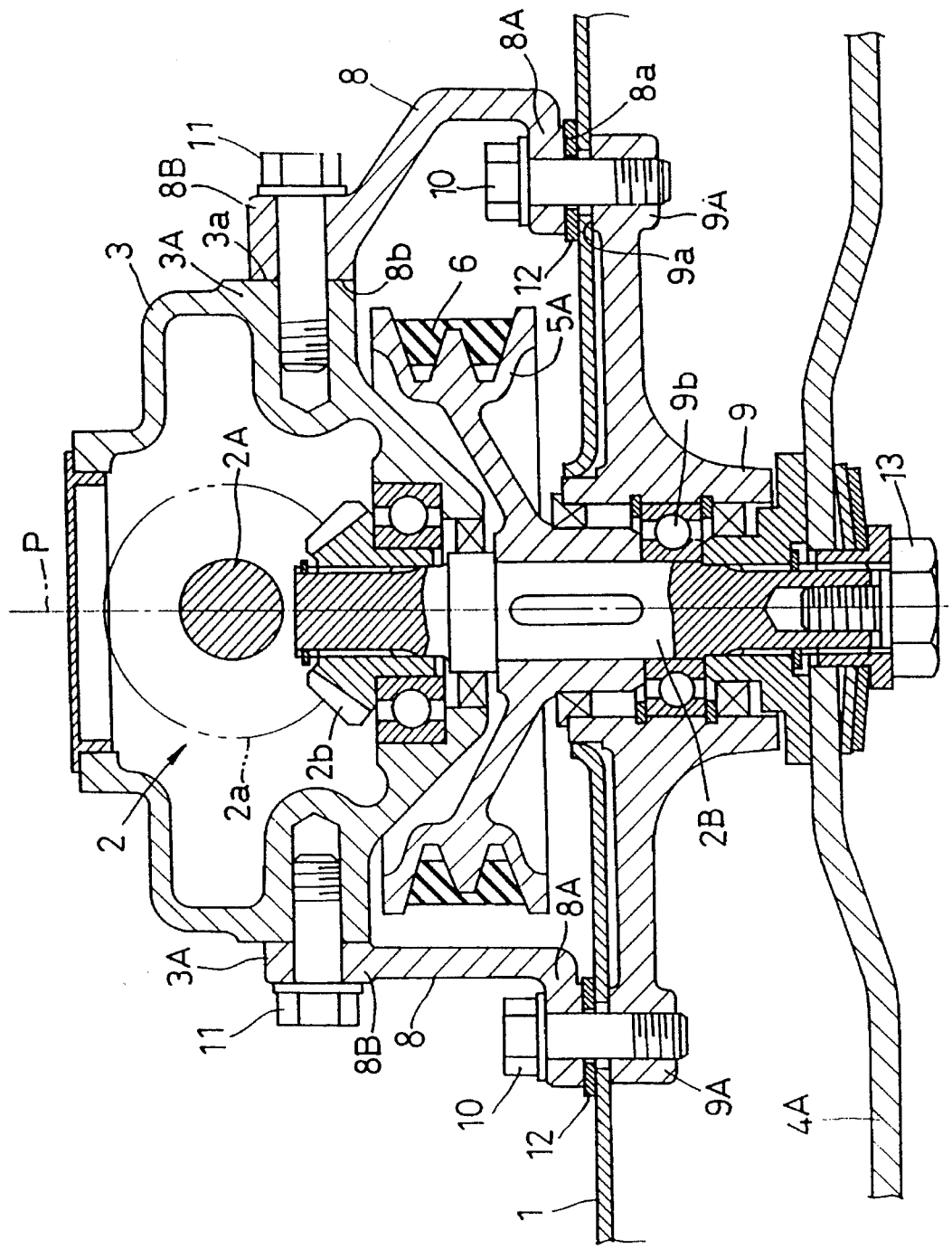
FIG. 2 is a front view in vertical section of a bevel gear case, support stays and a bearing holder.
Figure 3:
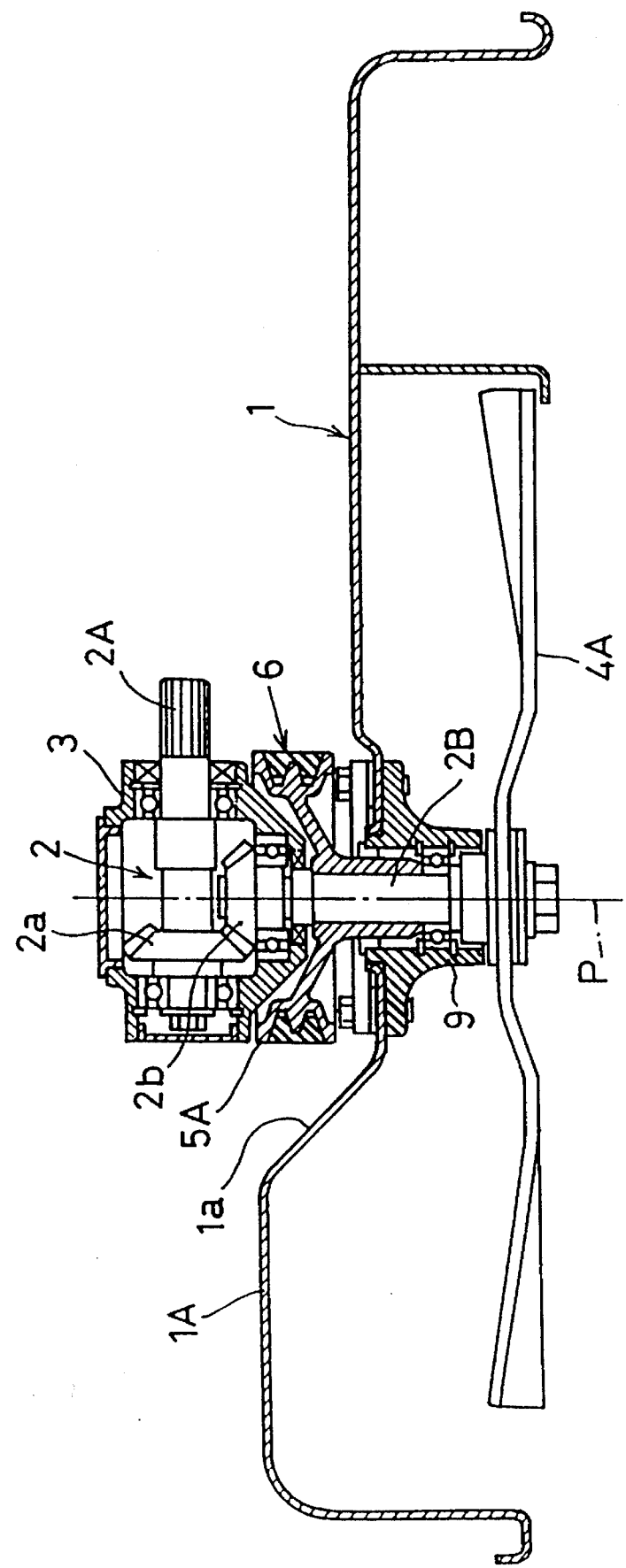
FIG. 3 is a side view in vertical section of the mower unit.

FIG. 1 shows a three-blade mower unit 100 attached to a lawn tractor or the like and having three blades arranged in a blade housing 1 to be rotatable about vertical axes P. As shown in FIGS. 2 and 3, the mower unit 100 includes a bevel gear mechanism 2 mounted in a bevel gear case 3 disposed above the blade housing 1. The bevel gear mechanism 2 includes an input shaft 2A extending substantially horizontally and receiving power from the tractor, a first bevel gear 2a mounted on the input shaft 2A, an output shaft 2B extending substantially vertically, and a second bevel gear 2b meshed with the first bevel gear 2a and mounted on an upper end of the output shaft 2B. A center blade 4A is mounted on a lower end of the output shaft 2B of the bevel gear mechanism 2. The center blade 4A is driven by an engine of the tractor. Opposite side blades 4B are driven through a belt transmission 6 wound around an output pulley 5A mounted on the output shaft 2B and output pulleys 5B mounted on opposite side blade shafts.

The bevel gear case 3 is mounted on an upper surface of the blade housing 1 through a pair of right and left support stays 8. The output shaft 2B is rotatably supported through a bearing 9b supported by a beating holder 9 attached to an inner surface of the blade housing 1. For this purpose, each support stay 8 includes a flange 8A formed at one end thereof and defining a horizontal flange surface 8a on a lower surface of the flange 8A, while the bearing holder 9 has flanges 9A formed peripherally thereof and defining horizontal flange surfaces 9a on upper surfaces of the flanges 9A. The right and left support stays 8 are shaped differently in this embodiment, but may of course have the same shape. The flanges 8A of the support stays 8 and the flanges 9A of the bearing holder 9 define reamed bores for receiving reamer belts 10. Further, the blade housing 1 has an opening for receiving a boss of the bearing holder 9, and bores for receiving the reamer bolts 10. The support stays 8 and bearing holder 9 are tightened together, with the blade housing 1 interposed therebetween, by the reamer bolts 10 extending vertically.

Copper plates 12 acting as soft metal packings are interposed between the support stays 8 of the bevel gear case 3 and the blade housing 1. The copper plates 12 are elastically deformable with tightening of the reamer bolts 10 to fit with the upper surface of the blade housing 1. Thus, the copper plates 12 accommodate differences in thickness of the blade housing 1 occurring transversely and longitudinally of the tractor which are due to manufacturing errors. Instead of the copper plates, aluminum plates may be employed as the soft metal packings.

The bevel gear case 3 and support stays 8 are interconnected by horizontally extending reamer bolts 11, with vertical flange surfaces 3a and 8b formed on flanges 3A and 8B thereof in face to face contact. The flanges 3A of the bevel gear case 3 and the flanges 8B of the support stays 8 has reamed bores formed therein with high precision. Thus, the bevel gear case 3 and support stays 8 are integrated in a desired positional relationship.

The reamed bores of the support stays 8 and bearing holder 9 for receiving the reamer bolts 10 and 11 are formed with high precision. However, the bores of the blade housing 1 for receiving the reamer bolts 10 are simple, loose-fitting bores.

The center blade 4A is attached to the lower end of the output shaft 2B by a bolt 13 after the bearing holder 9 is attached to the blade housing 1.

As shown in FIG. 3, the blade housing 1 includes a raised front portion 1A extending transversely of the tractor for defining a grass clipping discharge passage. The raised portion 1A has a gently inclined surface extending rearwardly. This construction inhibits turbulence of grass carrying air produced by rotation of the blades, thereby to suppress noise due to the turbulence.

Another embodiment will be described next.

Figure 4:
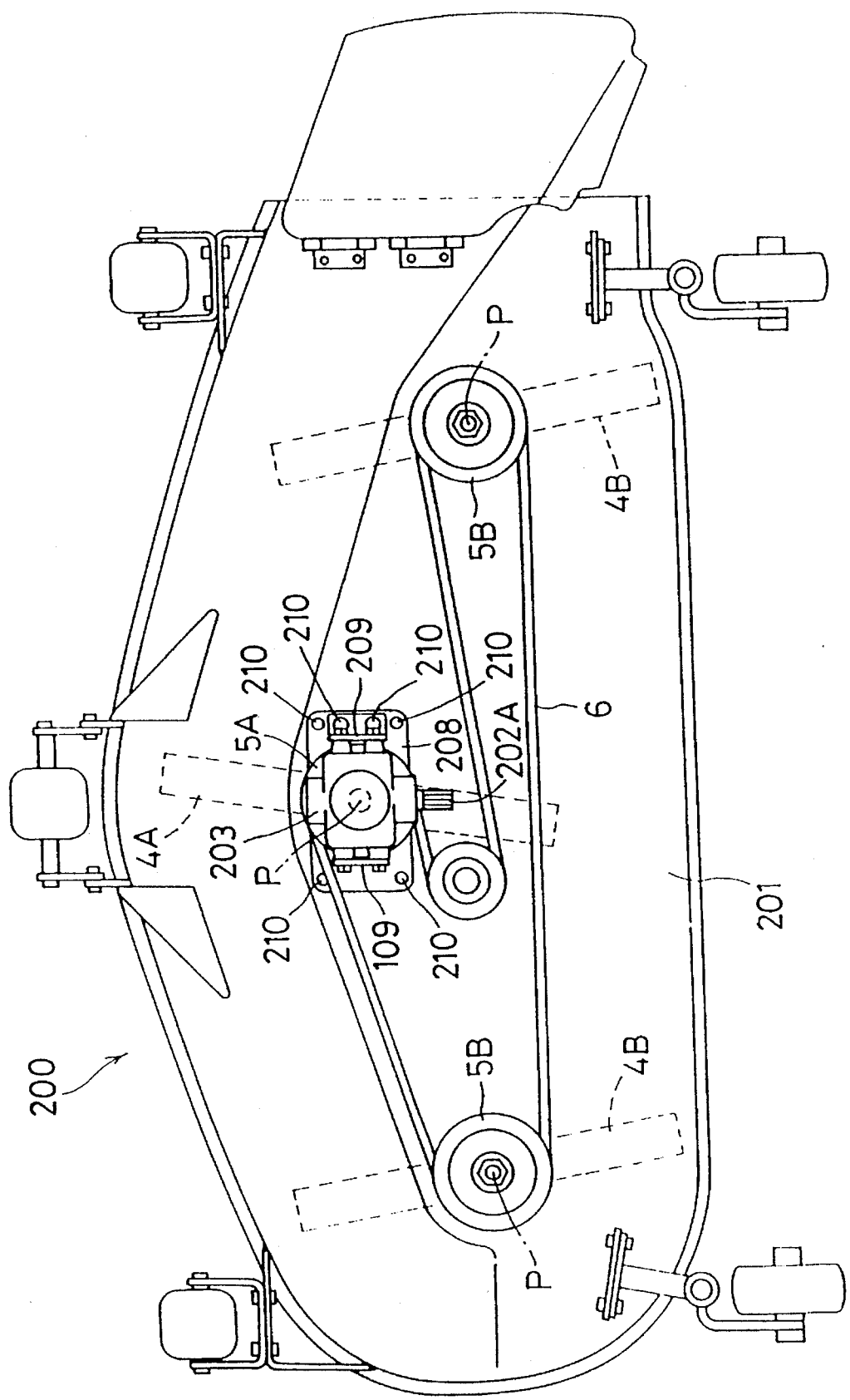
FIG. 4 is a plan view of a mower unit in a different embodiment of the invention.
Figure 5:
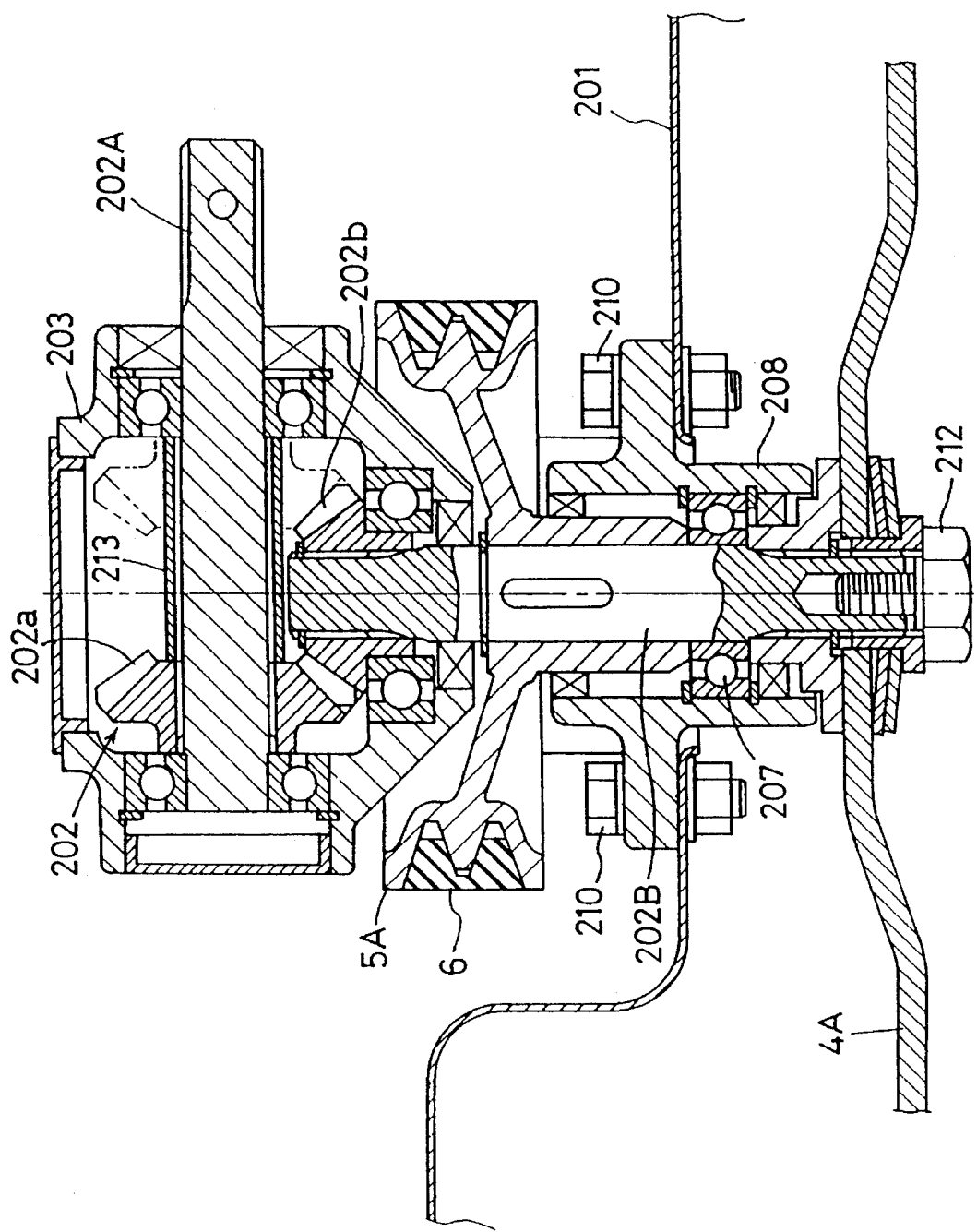
FIG. 5 is a side view in vertical section of a bevel gear case, support stays and a bearing holder in the different embodiment.
Figure 6:
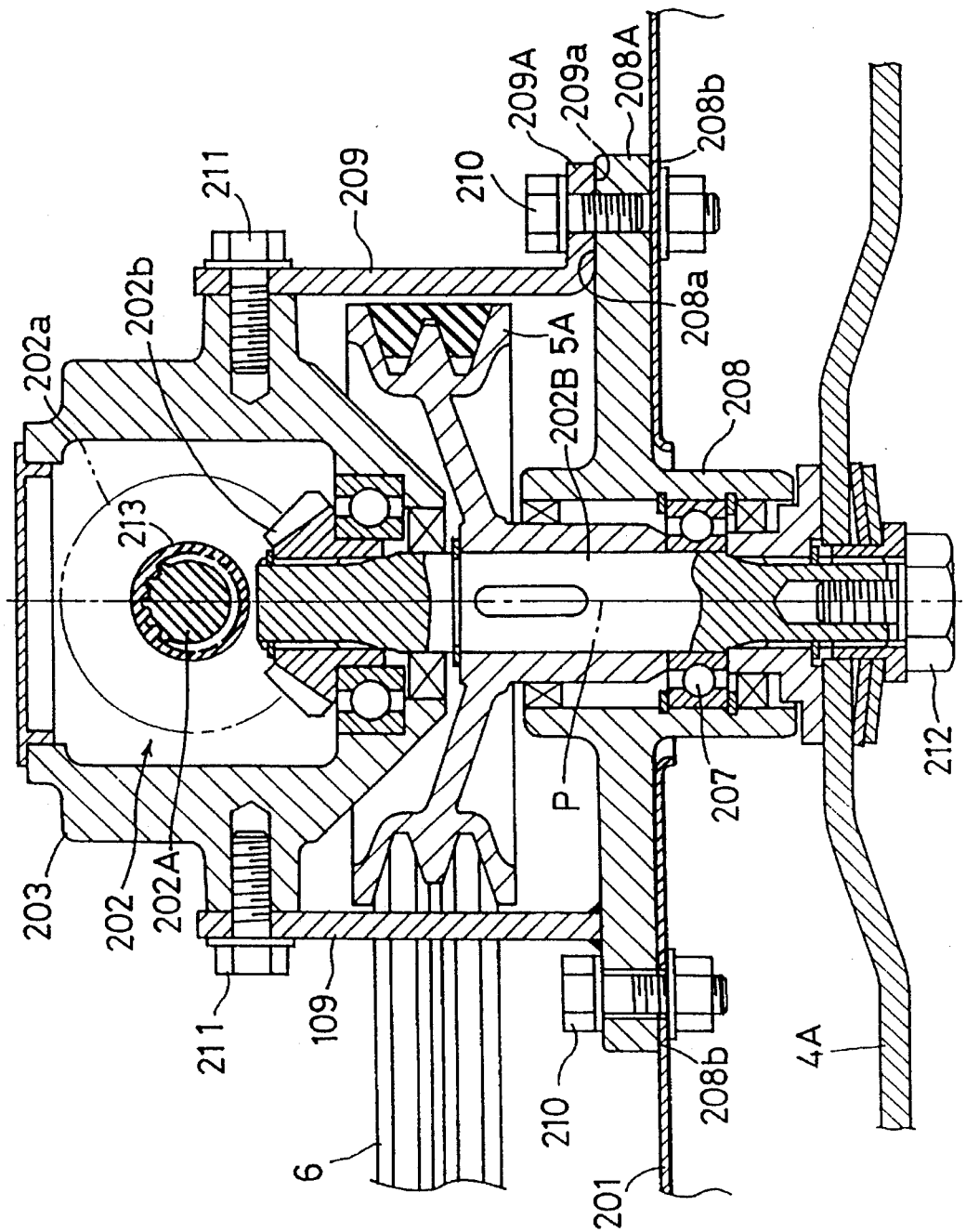
FIG. 6 is a front view in vertical section of the bevel gear case, support stays and bearing holder in the different embodiment.

FIG. 4 shows a three-blade mower unit 200 attached to a lawn tractor or the like and having three blades arranged in a blade housing 201 to be rotatable about vertical axes P. As shown in FIG. 5, and as in the preceding embodiment, the mower unit 200 includes a bevel gear mechanism 202 driven by power from the engine and mounted in a bevel gear case 203 disposed above the blade housing 1. The bevel gear mechanism 202 includes an output shaft 202B carrying a center blade 4A. Opposite side blades 4B are driven through a belt transmission 6 wound around an output pulley 5A mounted on the output shaft 202B and output pulleys 5B mounted on opposite side blade shafts. The output shaft 202B is rotatably supported through a beating 207 supported by a bearing holder 208. This embodiment differs from the preceding embodiment in that, as shown in FIG. 6, the bearing holder 208 and bevel gear case 203 are interconnected through a pair of tight and left support stays 109 and 209 connected to upper surfaces of the bearing holder 208, to form an integrated unit. The bevel gear case 203 and bearing holder 208 in unit form are attached to the upper surface of the blade housing 1. Specifically, the bearing holder 208 has flanges 208A formed peripherally thereof and defining substantially horizontal upper flange surfaces 208a and lower flange surfaces 208b. One of the support stays 209 has a lower end thereof bent 90 degrees to provide a flange 209A defining a substantially horizontal lower flange surface 209a. In this embodiment, the bearing holder 208 and one of the support stays 209 are interconnected by bolts 210, with the flange surfaces in face to face contact, while the other support stay 109 is welded to an upper surface of the bearing holder 208. The support stays 109 and 209 and bevel gear case 203 are interconnected by horizontally extending reamer bolts 211, with vertical flange surfaces thereof in face to face contact.

The bevel gear case 203 and beating holder 208 interconnected through the support stays 109 and 209 and integrated into a unit are bolted to the upper surface of the blade housing 1, utilizing the lower flange surfaces 208b of the beating holder 208. The bolts 210 interconnecting the bearing holder 208 and support stay 209 act also as part of connecting bolts connecting this unit to the blade housing 1. Reamer bolts may be employed as the connecting bolts in order to achieve high connecting precision.

The center blade 4A is attached to the lower end of the output shaft 202B by a bolt 212 after the bearing holder 208 is attached to the blade housing 1.

As shown in FIG. 5, the bevel gear mechanism 202 mounted in the bevel gear case 203 includes an input shaft 202A supported in two positions thereof by the bevel gear case 203, and a bevel gear 202a mounted on the input shaft 202A. The bevel gear 202a may be placed in a position shown in solid lines or in a position shown in phantom lines for meshing with a bevel gear 202b mounted on the output shaft 202B. Thus, a position and facing direction of the bevel gear 202a is selected, and a spacer 213 splined to the input shaft 202A is used to maintain the bevel gear 202a in place. In this way, the output shaft 202B is rotatable always in one direction regardless of the direction in which a PTO shaft of the tractor rotates.

What is claimed is:

1. A mower unit having a bevel gear mechanism, comprising:

an input shaft extending substantially horizontally;

a first bevel gear mounted on said input shaft;

an output shaft extending substantially vertically;

a second bevel gear meshed with said first bevel gear and mounted on one end of said output shaft;

a blade mounted on the other end of said output shaft;

a blade housing covering said blade and defining an opening for receiving said output shaft;

a bearing holder rotatably supporting said output shaft and including first flange means defining first flange surfaces;

a bevel gear case containing said first and second bevel gears;

a pair of right and left support stays connected to said bevel gear case for mounting said bevel gear case to said blade housing, said support stays including second flange means defining second flange surfaces; and reamer bolts interconnecting said first flange means and said second flange means, with said blade housing interposed between said first flange surfaces and said second flange surfaces.

2. A mower unit as defined in claim 1, wherein said first flange surfaces and said second flange surface extend substantially horizontally.

3. A mower unit as defined in claim 1, further comprising soft metal packings interposed between said second flange surfaces and upper surfaces of said blade housing.

4. A mower unit as defined in claim 2, wherein:

said support stays further include third flange means defining third flange surfaces; and said bevel gear case further includes fourth flange means defining fourth flange surfaces;

said third flange means and said fourth flange means being interconnected by reamer bolts.

5. A mower unit as defined in claim 4, wherein said third flange surfaces and said fourth flange surfaces extend substantially vertically.

6. A mower unit having a bevel gear mechanism, comprising:

an input shaft extending substantially horizontally;

a first bevel gear mounted on said input shaft;

an output shaft extending substantially vertically;

a second bevel gear meshed with said first bevel gear and mounted on one end of said output shaft;

a blade mounted on the other end of said output shaft;

a blade housing covering said blade and defining an opening for receiving said output shaft;

a bearing holder rotatably supporting said output shaft and including first flange means defining upper and lower flange surfaces;

a bevel gear case containing said first and second bevel gears;

a pair of fight and left support stays connected to said bevel gear case for mounting said bevel gear case to said blade housing, said support stays including second flange means defining flange surfaces; and connecting means for interconnecting said upper flange surfaces of said first flange means and said flange surfaces of said second flange means, and interconnecting said lower flange surfaces of said first flange means and upper surfaces of said blade housing.

7. A mower unit as defined in claim 6, wherein said connecting means includes reamer bolts.

8. A mower unit as defined in claim 7, wherein said upper and lower flange surfaces of said first flange means and said flange surfaces of said second flange means extend substantially horizontally.

* * * * *

UNITED STATES PATENT AND TRADEMARK OFFICE
CERTIFICATE OF CORRECTION

PATENT NO. : 5,465,561
DATED : November 14, 1995
INVENTOR(S) : Kazuo Samejima; Mitsuhiro Matsuyama; Shigeru Morita and Masaji Kure It is certified that error appears in the above-indentified patent and that said Letters Patent is hereby corrected as shown below:

On the title page item [57],

Abstract Line 7 "coveting" should read --covering--.

Abstract Line 8 "beating" should read --bearing--.

Abstract Line 10 "fight" should read --right--.

Abstract Line 15 "beating" should read --bearing--.

Column 1 Line 19 "beating" should read --bearing--.

Column 1 Line 30 "beating" should read --bearing--.

Column 1 Line 51 "beating" should read --bearing--.

Column 1 Line 52 "tight" should read --right--.

Column 2 Line 2 "fight" should read --right--.

Column 2 Line 63 "beating" should read --bearing--.

Column 3 Line 7 "belts" should read --bolts--.

Column 3 Line 60 "beating" should read --bearing--.

Column 3 Line 64 "tight" should read --right--.

UNITED STATES PATENT AND TRADEMARK OFFICE
CERTIFICATE OF CORRECTION

PATENT NO. : 5,465,561
DATED : November 14, 1995
INVENTOR(S) : Kazuo Samejima; Mitsuhiro Matsuyama; Shigeru Morita and Masaji Kure It is certified that error appears in the above-indentified patent and that said Letters Patent is hereby corrected as shown below:

Column 4 Line 15 "beating" should read --bearing--.

Column 4 Line 19 "beating" should read --bearing--.

Claim 6 Line 8 Column 6 "fight" should read --right--.

Signed and Sealed this

Thirtieth Day of April, 1996

Attest:

BRUCE LEHMAN

Attesting Officer

Commissioner of Patents and Trademarks